(12) United States Patent
Watanabe et al.

(10) Patent No.: US 7,431,880 B2
(45) Date of Patent: Oct. 7, 2008

(54) METHOD FOR MANUFACTURING POROUS CERAMIC STRUCTURE

(75) Inventors: Takehiko Watanabe, Toki (JP); Hiroyuki Suenobu, Suzhou (CN); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/495,580

(22) Filed: Jul. 31, 2006

(65) Prior Publication Data

US 2007/0045909 A1 Mar. 1, 2007

(30) Foreign Application Priority Data

Aug. 12, 2005 (JP) ............... 2005-234264

(51) Int. Cl.
 *C04B 33/32* (2006.01)
(52) U.S. Cl. ...................... 264/630; 264/628
(58) Field of Classification Search ............. 264/628, 264/630
 See application file for complete search history.

(56) References Cited

U.S. PATENT DOCUMENTS 6,808,663 B2 * 10/2004 Noguchi et al. ............... 264/44

FOREIGN PATENT DOCUMENTS

| JP | A-7-163822 | 6/1995 |
| JP | A 2003-40687 | 2/2003 |
| JP | A 2004-315346 | 11/2004 |
| WO | WO 02/70434 | * 2/2002 |

* cited by examiner

*Primary Examiner*—Carlos Lopez
*Assistant Examiner*—Russell J Kemmerle, III
(74) *Attorney, Agent, or Firm*—Oliff & Berridge, PLC

(57) ABSTRACT

There is provided a method for manufacturing a porous ceramic structure, including: firing a formed body containing ceramic particles and a combustible powder functioning as a pore former, and burning off the combustible powder to obtain the porous ceramic structure. As the combustible powder, porous resin particles having an average particle diameter of 10 to 50 μm and a porosity of 50 to 90% are used. The method for manufacturing a porous ceramic structure can inhibit the combustible powder functioning as a pore former from being smashed upon mixing/kneading a forming raw material and suppressing an excess heat generation upon firing and can manufacture a porous ceramic structure having a stable porosity with a good yield.

4 Claims, 1 Drawing Sheet

METHOD FOR MANUFACTURING POROUS CERAMIC STRUCTURE

BACKGROUND OF THE INVENTION AND RELATED ART STATEMENT

The present invention relates to a porous ceramic structure suitably used, for example, as a filtration material of a filter.

There has been used a porous ceramic structure containing a ceramic excellent in thermal resistance and corrosion resistance as a filtration material for filters used for an environmental measure such as antipollution or the like, or recovery of products from high temperature gas, or the like, in various fields including chemistry, electric power, steels, and industrial waste disposal. A honeycomb-shaped porous ceramic structure has suitably been used as a dust-collecting filter used at high temperature in a corrosive gas atmosphere, such as a diesel particulate filter (DPF), which traps particulate matter (PM) discharged from a diesel engine such as an automobile diesel engine.

As a porous ceramic structure used in a dust-collecting filter, there has widely been used a honeycomb-shaped porous ceramic structure 25 where a number of cells 23 are partitioned and formed by the partition walls 24, and the inlet side end face B and the outlet side end face C are alternately plugged with a plugging member 22, for example, a dust-collecting filter 21 shown in FIG. 3. According to the dust-collecting filter 21, which has such a structure, when the target gas $G_1$ introduced in a part of the cells 23 from the inlet side end face B passes through the partition walls 4 and flows into the adjacent cells 23, particulate matter containing the target gas $G_1$ is trapped in the partition walls 24. Then, treated gas $G_2$, which has passed through the partition walls 24 and flew in the adjacent cells 23, is discharged from the outlet side end face C. Therefore, treated gas $G_2$, where particulate matter in the target gas $G_1$ is separated and removed, can be obtained.

By the way, in recent years, a porous ceramic structure having high porosity has been demanded because of the necessity of improving treatability of a duct-correcting filter by reducing a pressure loss when gas passes through partition walls. When such a porous ceramic structure having high porosity is manufactured, generally a combustible power which functions as a pore former is added to a forming raw material. The combustible powder is burnt off when the formed body is fired, and pores are formed at the location where the powder has been present. Therefore, a porous ceramic structure having high porosity can be obtained. As such a combustible power to function as a pore former, there have conventionally been used solid particles such as carbon, cokes, or solid resin particles, or hollow particles such as foaming resin particles (see Patent Documents 1 to 3).

Patent Document 1: JP-A-7-163822
Patent Document 2: JP-A-2003-40687
Patent Document 3: JP-A-2004-315346

However, in the case that solid particles among the above combustible particles are used as a pore former, the particles are hardly smashed upon mixing/kneading of a forming raw material because the particles are solid, and therefore, a stable porosity can be secured. On the other hand, since the particles have high exothermic rate upon firing, the particles have a problem of frequently having inferiority such as a crack and an internal defect. In the case that hollow particles are used as a pore former, the particles have low exothermic rate upon firing since the particles are hollow, thereby inhibiting inferiority as described above from being caused. However, since the particles are easily smashed upon mixing/kneading of a forming raw material, a stable porosity cannot be secured, and the particles have a problem of deteriorated filter properties (pressure drop for trapping, strength, trapping efficiency, etc.), for example, when the particles are used for a filtration material for a filter.

The present invention has been made in such conventional circumstances and aims to provide a method for manufacturing a porous ceramic structure, the method being capable of inhibiting the combustible powder functioning as a pore former from being smashed upon mixing/kneading a forming raw material and suppressing an excess heat generation upon firing and manufacturing a porous ceramic structure having a stable porosity with a good yield.

SUMMARY OF THE INVENTION

According to the present invention, there is provided a method for manufacturing a porous ceramic structure, comprising: firing a formed body containing ceramic particles and a combustible powder functioning as a pore former, and burning off the combustible powder to obtain the porous ceramic structure, wherein, as the combustible powder, porous resin particles having an average particle diameter of 10 to 50 μm and a porosity of 50 to 90% are used.

Incidentally, in the present invention, "porosity" of the porous resin particles is a value obtained by a measured value regarding the size of pores, such as a distribution of pore diameters and a surface area. For their measurement, gas adsorption or porosimetry is employed.

According to a method for manufacturing a porous ceramic structure of the present invention, by using porous resin particles, which has a low exothermic rate upon firing in comparison with solid particles and are hardly smashed in comparison with hollow particles, as a pore former, the combustible powder functioning as a pore former can be inhibited from being smashed upon mixing/kneading a forming raw material, and an excess heat generation can be inhibited upon firing, thereby manufacturing a porous ceramic structure having a stable porosity with a good yield.

DESCRIPTION OF PREFERRED EMBODIMENT

Figure 1:
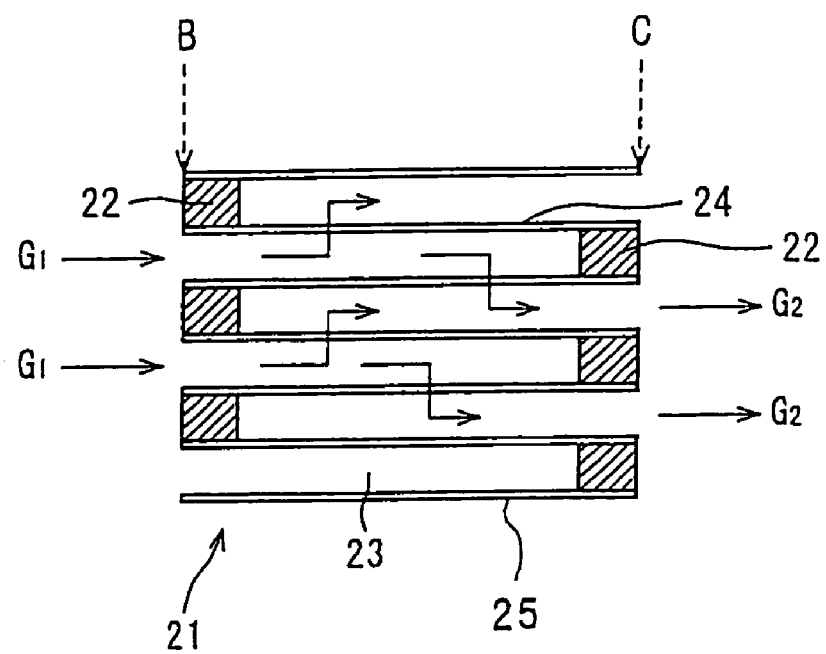
FIG. 1 is a schematic view showing an example of a dust-collecting filter using a porous ceramic structure.

Embodiments of the present invention will hereinbelow be described. However, the present invention is limited to the following embodiments, and it should be understand that a change, an improvement, or the like, in design may suitably be given on the basis of ordinary knowledge of those skilled in the art.

A method for manufacturing a porous ceramic structure of the present invention is a method where a formed body containing ceramic particles and a combustible powder functioning as a pore former is fired and burned off the combustible powder to obtain the porous ceramic structure. This method is characterized in that, as the combustible powder, porous resin particles having an average particle diameter of 10 to 50 μm and a porosity of 50 to 90% are used.

The inventors made researches to fined that using porous resin particles having a mean particle diameter of 10 to 50 μm, preferably 20 to 40 μm, more preferably 25 to 35 μm, and a porosity of 50 to 90%, preferably 60 to 80%, and more preferably 65 to 75% as a pore former upon manufacturing a porous ceramic structure can suppress heat generation of particles upon firing in comparison with the case of using conventional solid particles, and therefore inferiority such as a crack and an internal defect is hardly caused due to thermal stress. In addition, particles are hardly smashed upon mixing/kneading of a forming raw material in comparison with the case of using conventional hollow particles, and therefore a stable porosity can easily be secured.

That is, since the above porous resin particle has a number of pores in the particle, it has low combustion exothermic ratio upon firing in comparison with a solid particle having about the same size. Further, since the porous resin particle is not in a hollow condition unlike a foaming resin particle though the porous resin particle has pores in the particle, it has high hardness and strength of the particle in comparison with such a hollow particle. Therefore, the use of the above porous resin particles as a pore former can inhibit both excess heat generation of particles upon firing, which is a problem caused when solid particles are used, and a smash of particles upon mixing/kneading a forming raw material, which is a problem caused when hollow particles are used. As a result, a porous ceramic structure having a stable porosity can be manufactured with a good yield.

When the porous resin particle has a mean particle diameter of below 10 μm, in the case of using as a filtration material for a filter, the filter has a small mean pore diameter. As a result, a trapping pressure loss is increased. On the other hand, when the mean particle diameter is above the 50 μm, porosity is increased. As a result, the trapping efficiency is deteriorated. In addition, when the porous resin particles have a porosity of below 50%, inferiority by heat generation is prone to be caused to affect yield since combustion exothermic ratio upon firing is raised. On the other hand, a smash upon kneading is prone to be caused, and variance in porosity is caused, which makes the quality unstable.

A manufacturing method of the present invention can be performed in the same process as in the conventional method for manufacturing a porous ceramic structure except for the use of porous resin particles having a predetermined mean particle diameter and porosity as described above as a pore former. That is, to ceramic particles to function as framework raw material particles, are added an organic binder, water, and the like, besides the aforementioned porous resin particles as a pore former, and they are mixed and kneaded to give a forming raw material (clay), which is then formed in a predetermined shape by various forming method. Then, the formed body is dried generally in a drying method such as hot air drying or microwave drying. Further, as necessary, cutting, grinding, or the like, is performed for the purpose of adjusting the shape, followed by firing under predetermined conditions. By this firing, the framework particles are sintered for densification, and the above porous resin particles as a pore former are burnt off to form pores at the locations where the powder has been present. Thus, a porous ceramic structure can be obtained.

The ceramic particles which function as framework raw material particles may be one kind or a mixture of two more kinds of ceramic particles. The specific kind may be selected in consideration of the use, or the like, of the porous ceramic structure. For example, in the case that a cordierite porous ceramic structure is manufactured as a filtration material of a DPF, which requires thermal resistance, there is prepared cordierite-forming raw material particles (particles of a substance which can be converted into cordierite by firing) containing, as the framework raw material particles, kaolin particles, talc particles, aluminum hydroxide particles, alumina particles, silica particles, or the like, at a predetermined ratio, and the above porous resin particles, organic binder, water, and the like, are added thereto and mixed and kneaded to obtain a forming raw material.

An amount of the porous resin particles functioning as a pore former is determined according to porosity or the like of a porous ceramic structure to be finally obtained. For example, it is preferable that the amount is 2 to 20% by mass of the total amount of ceramic particles and porous resin particles. When the porous resin particles are added within such a range, suitable filter properties are easily obtained, for example, in the case of using the particles as a filtration material of a filter for a DPF, or the like.

With regard to the porous resin particles used as a pore former in the present invention, there is no limitation on quality of the material (kind of resin) as long as a mean particle diameter and a porosity of the particles are within the above ranges, and suitable examples of the resin include ones constituted by methacrylate, polyimide, ethylenevinyl acetate, polypropylene, polyethylene, or methyl methacrylate. Porous resin particles constituted by such a resin can be manufactured in, for example, phase separation or extraction.

There is no particular limitation on shape of a porous ceramic structure manufactured in a manufacturing method of the present invention, and a shape can be determined according to the use. For example, when it is used as a filtration material of a DPF or the like, the structure may have a shape of a honeycomb (honeycomb structure), which is a general shape as a DPF. A porous ceramic structure having a honeycomb shape can be manufactured by drying and firing a formed body obtained by extrusion forming using a mouthpiece having desired cell shape, partition wall thickness, and cell density.

The present invention will hereinbelow be described in more detail on the basis of Examples. However, the present invention is by no means limited to these Examples.

Examples 1 to 9, Comparative Examples 1 to 8

There was prepared, as cordierite-forming raw material particles as the main raw material, a material containing 4 kinds of particles of talc (mean particle diameter of 25 μm), kaolin (mean particle diameter of 10 μm), alumina (mean particle diameter of 5 μm), and silica (mean particle diameter of 30 μm) so as to give a composition (MgO: 13.6±0.5%, $Al_2O_3$: 35.7±0.5%, $SiO_2$: 50.7±±0.5%) of the cordierite. To the main raw material was added a predetermined amount of the pore former (combustible powder) shown in Table 1, and a predetermined amount of an organic binder (hydroxypropylmethyl cellulose) and a surfactant were added to the mixture, followed by dry mixing. A predetermined amount of water was further added to the mixture by spraying, and the mixture was mixed for 3 minutes. Then, the mixture was kneaded for 60 minutes with a sigma type kneader to obtain clay. The clay was further kneaded with a vacuum kneader and extruded to obtain clay formed into a cylindrical shape.

A honeycomb-shaped formed body having plurality of cells partitioned and formed by partition walls was obtained by a method where the cylindrical clay was subjected to extrusion forming using a mouthpiece having the cell shape, partition wall thickness, and cell density described below. The formation was performed with a ram extrusion molding machine. The formed body was subjected to microwave drying, and further hot air drying to obtain a dried body. The dried body was cut to have a predetermined dimensions. An adhesive sheet was applied on one of the end faces of the dried body, and holes were made only in the portions corresponding to the cells to be plugged of the adhesive sheet by laser processing utilizing image processing to give a mask. The end face having the mask of the dried body was immersed in ceramic slurry to fill the ceramic slurry into the cells to be plugged to form plugged portions. The same process was given to the other end face of the ceramic dried body, and then the plugged portions were fired together with the dried body to obtain a ceramic filter for DPF, which is a porous ceramic structure. As the ceramic slurry, slurry of cordierite forming raw material particles was used. As the firing conditions, the maximum temperature was 1420° C., the firing time at the highest temperature is 6 hours, and the total firing time was 120 hours.

The ceramic filter obtained above had a shape with a circular end face (cell opening face) shape having a diameter of 191 mm and with a length of 203 mm, and the porous ceramic structure had a honeycomb structure having cells each having a square shape with about 1.47 mm×1.47 mm with a partition wall thickness of 0.3 mm and a cell density of about 45 cells/cm$^2$(300 cells/inch$^2$). The plugged portions were formed so that adjacent cells were plugged at opposite ends as shown in FIG. 1, and each of the end faces showed a checkerwise pattern.

With regard to each of the ceramic filters (fired bodies) obtained in Examples 1 to 9 and Comparative Examples 1 to 8 as described above, a rate of firing inferiority, a rate of occurrence of an internal defect, a mean pore diameter, a porosity, variance in porosity, compression strength, a trapping pressure loss, and a trapping efficiency were checked, and a yield and properties were evaluate from the results. Further, an integrated evaluation was given on the basis of the evaluations. Incidentally, methods of measurement and evaluation were as follows:

[Rate of Firing Inferiority]

One hundred ceramic filters for each of the Examples and Comparative Examples were fired, and presence/absence of a crack was judged from an external appearance of each filter after firing to obtain a ratio of ceramic filters with a crack.

[Rate of Occurrence of Internal Defect]

One hundred ceramic filters for each of the Examples and Comparative Examples were fired, and presence/absence of an internal defect was judged by sending smoke into each filter after firing to detect leakage of the smoke to obtain a ratio of ceramic filters with an internal defect.

[Average Pore Diameter and Porosity]

The porosity and the mean pore diameter were calculated from the result of measurement of the pore diameter and the total pore volume by a mercury porosimetry, where mercury was put into the ceramic filter under pressure, using a mercury porosimeter produced by Micromeritecs Co. with a true specific gravity of cordierite of 2.52 g/cc.

[Variance in Porosity]

One hundred ceramic filters for each of the Examples and Comparative Examples were fired, and porosity of each filter after firing was calculated in the above method to obtain variance in porosity between filters (difference between the maximum porosity and the minimum porosity).

[Compression Strength]

Compression strength in a longitudinal direction of each filter was measured with an autograph.

[Pressure Loss after Trapping]

Combustion gas containing soot generated by light oil gas burner was sent into a ceramic filter arranged downstream thereof to measure a difference in pressure between front and back of the filter with soot being accumulated on the filter. Thus, a pressure loss was obtained in the state that soot was trapped.

[Trapping Efficiency]

Combustion gas containing soot generated by light oil gas burner was sent into a ceramic filter arranged downstream thereof to measure weight of the soot contained in each of the gas before passing the filter and the gas after passing the filter, both of them were separated from the upstream side and down stream side, respectively, of the filter. Form the ratio of them, a trapping efficiency of a filter was obtained.

[Yield]

One hundred ceramic filters for each of the Examples and Comparative Examples were fired, and One hundred ceramic filters for each of the Examples and Comparative Examples were fired, and each filter was observed to check presence/absence of firing inferiority and an internal defect to obtain a ratio of the ceramic filters with neither of them.

[Properties]

From the results of inspecting a rate of firing inferiority, a rate of occurrence of an internal defect, a mean pore diameter, a porosity, variance in porosity, compression strength, a trapping pressure loss, and a trapping efficiency, evaluation regarding preferable properties as a filter was given with "good" for particularly preferable ones, "fair" for preferable ones, and "bad" for ones which were not preferable. As specific standards of evaluation, ones having lower firing inferiority, rate of occurrence of an internal defect, variance in porosity, and trapping pressure loss and higher compression strength and trapping efficiency are more preferable. In addition, a preferable range of a mean pore diameter was 8 to 32 μm, and a preferable range of porosity was 50 to 65%.

[Integral Evaluation]

Integral evaluation was given from the results of evaluation regarding yield and properties with "good" for particularly preferable ones, "fair" for preferable ones, and "bad" for ones which were not preferable.

TABLE 1

| | Form of particle | Material | Mean particle diameter (μm) | Porosity of pore former (%) | Hardness of resin (kgf/mm$^2$) | Amount added (mass %) |
|---|---|---|---|---|---|---|
| Comp. Ex. 1 | Solid carbon | Carbon | 45 | 10 | — | 10 |
| Comp. Ex. 2 | Solid coke | Coke | 20 | 10 | — | 10 |
| Comp. Ex. 3 | Solid resin | Methacrylate | 30 | 15 | 0.6 | 10 |
| Comp. Ex. 4 | Foaming(hollow)resin | Nitrile-based | 45 | 85 | 0.1 | 10 |
| Example 1 | Porous resin | Methacrylate | 10 | 70 | 0.5 | 10 |
| Example 2 | Porous resin | Methacrylate | 30 | 50 | 0.7 | 10 |
| Example 3 | Porous resin | Methacrylate | 30 | 70 | 0.5 | 2 |
| Example 4 | Porous resin | Methacrylate | 30 | 70 | 0.5 | 10 |

TABLE 1-continued

|  | Form of particle | Material | Mean particle diameter (μm) | Porosity of pore former (%) | Hardness of resin (kgf/mm$^2$) | Amount added (mass %) |
|---|---|---|---|---|---|---|
| Example 5 | Porous resin | Methacrylate | 30 | 70 | 0.5 | 20 |
| Example 6 | Porous resin | Methacrylate | 30 | 90 | 0.3 | 10 |
| Example 7 | Porous resin | Methacrylate | 50 | 70 | 0.5 | 10 |
| Comp. Ex. 5 | Porous resin | Methacrylate | 30 | 45 | 0.7 | 10 |
| Comp. Ex. 6 | Porous resin | Methacrylate | 30 | 95 | 0.2 | 10 |
| Comp. Ex. 7 | Porous resin | Methacrylate | 8 | 70 | 0.5 | 10 |
| Comp. Ex. 8 | Porous resin | Methacrylate | 55 | 70 | 0.5 | 10 |
| Example 8 | Porous resin | Methacrylate | 30 | 70 | 0.5 | 1 |
| Example 9 | Porous resin | Methacrylate | 30 | 70 | 0.5 | 25 |

TABLE 2

| | Rate of various inferiority and properties of filter | | | | | | | | | |
|---|---|---|---|---|---|---|---|---|---|---|
| | Firing inferiority (%) | Internal defect (%) | Mean Pore diameter (μm) | Porosity (%) | Variance in porosity (%) | Compression strength (MPa) | Trapping pressure loss (kPa) | Trapping efficiency (%) | Yield (%) | Judgement | |
| | | | | | | | | | | Properties | Integral Evaluation |
| Comp. Ex. 1 | 12 | 25 | 25 | 66 | 6 | 4.5 | 13.2 | 86 | 63 | Bad | Bad |
| Comp. Ex. 2 | 12 | 22 | 22 | 62 | 7 | 5.0 | 14.3 | 89 | 68 | Bad | Bad |
| Comp. Ex. 3 | 10 | 20 | 22 | 60 | 5 | 5.2 | 14.5 | 92 | 70 | Bad | Bad |
| Comp. Ex. 4 | 8 | 15 | 20 | 58 | 12 | 5.4 | 15.6 | 92 | 77 | Bad | Bad |
| Example 1 | 5 | 8 | 8 | 52 | 5 | 6.3 | 17.4 | 95 | 85 | Good | Good |
| Example 2 | 5 | 15 | 22 | 60 | 4 | 5.3 | 14.5 | 90 | 80 | Good | Good |
| Example 3 | 3 | 8 | 18 | 52 | 4 | 6.3 | 16.4 | 97 | 87 | Good | Good |
| Example 4 | 5 | 10 | 20 | 58 | 5 | 5.5 | 15.3 | 95 | 85 | Good | Good |
| Example 5 | 8 | 12 | 22 | 64 | 7 | 4.7 | 14.4 | 92 | 82 | Good | Good |
| Example 6 | 5 | 8 | 18 | 55 | 14 | 6.0 | 16.6 | 93 | 85 | Good | Good |
| Example 7 | 5 | 12 | 30 | 63 | 5 | 5.2 | 12.3 | 90 | 85 | Good | Good |
| Comp. Ex. 5 | 10 | 22 | 22 | 62 | 5 | 5.0 | 14.7 | 91 | 70 | Good | Bad |
| Comp. Ex. 6 | 3 | 8 | 15 | 53 | 16 | 6.3 | 18.2 | 94 | 87 | Bad | Bad |
| Comp. Ex. 7 | 5 | 8 | 5 | 50 | 4 | 6.5 | 19.7 | 95 | 85 | Bad | Bad |
| Comp. Ex. 8 | 5 | 25 | 35 | 65 | 5 | 4.5 | 10.3 | 85 | 75 | Bad | Bad |
| Example 8 | 3 | 8 | 18 | 48 | 4 | 6.5 | 18.2 | 94 | 87 | Fair | Fair |
| Example 9 | 8 | 12 | 22 | 67 | 8 | 4.5 | 14.3 | 86 | 82 | Fair | Fair |

As shown in Table 2, Examples 1 to 9, where porous resin particles having a mean particle diameter of 10 to 50 μm and a porosity of 50 to 90% as a pore former, showed excellent results regarding both a yield and properties in comparison with Comparative Examples 1 to 4, where solid particles or hollow particles were used, and Comparative Examples 5 to 8, where porous resin particles whose mean particle diameter or porosity is out of the above range were used.

The present invention can suitably be used as a method for manufacturing a porous ceramic structure used as a filtration material or the like for a filter.

What is claimed is:

1. A method for manufacturing a porous ceramic structure, comprising:
    firing a formed body containing ceramic particles and a combustible powder functioning as a pore former, and burning off the combustible powder to obtain the porous ceramic structure,
    wherein, as the combustible powder, porous resin particles having an average particle diameter of 10 to 50 μm and a porosity of 50 to 90% are used, each porous resin particle having a plurality of pores.

2. A method for manufacturing a porous ceramic structure according to claim 1, wherein an amount of adding the porous resin particles is 2 to 20% by mass of the total mass of the ceramic particles and the porous resin particles.

3. A method for manufacturing a porous ceramic structure according to claim 1, wherein the porous ceramic structure is a honeycomb structure.

4. A method for manufacturing a porous ceramic structure according to claim 3, wherein the honeycomb structure is used as a filtration material for a filter.

* * * * *